United States Patent
Chao et al.

(10) Patent No.: US 7,506,422 B2
(45) Date of Patent: Mar. 24, 2009

(54) METHOD FOR PROCESSING A LENS BARREL HAVING A TUBULAR WALL THAT DEFINES A HOLE, AND DEVICE FOR IMPLEMENTING THE METHOD

(75) Inventors: Sheng-Jui Chao, Taichung (TW); Cheng-Hsin Chen, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 938 days.

(21) Appl. No.: 10/985,987

(22) Filed: Nov. 12, 2004

(65) Prior Publication Data

US 2005/0278916 A1      Dec. 22, 2005

(30) Foreign Application Priority Data

Jun. 17, 2004   (TW) .............................. 93117486 A

(51) Int. Cl.
*B23P 23/00*     (2006.01)
(52) U.S. Cl. ................... 29/27 C; 409/165; 409/192; 82/122
(58) Field of Classification Search ............. 29/27 C; 409/192, 165; 82/122
See application file for complete search history.

(56) References Cited

U.S. PATENT DOCUMENTS

| | | | | |
|---|---|---|---|---|
| 6,457,919 B1 * | 10/2002 | Sangster | ..................... | 409/192 |
| 6,760,961 B2 * | 7/2004 | Upadhya | ..................... | 29/27 C |
| 7,143,489 B1 * | 12/2006 | Giebmanns | ................. | 409/167 |

* cited by examiner

*Primary Examiner*—Dana Ross
(74) *Attorney, Agent, or Firm*—Pillsbury Winthrop Shaw Pittman LLP

(57) ABSTRACT

A method for processing a lens barrel includes the steps of: (a) providing a processing device including a processing shaft and a cutting tool; (b) moving the lens barrel and the processing shaft relative to each other so that an image of the cutting tool projected on a plane that intersects a tubular wall of the lens barrel is orthogonal to the tubular wall; (c) moving the processing shaft relative to the lens barrel so that the cutting tool is close to the tubular wall; (d) moving the processing shaft relative to the lens barrel so that the cutting tool is in touch with the tubular wall; (e) moving the processing shaft and the lens barrel relative to each other so that the lens barrel is formed with a continuous groove on the tubular wall; and (f) moving the cutting tool away from the lens barrel.

16 Claims, 18 Drawing Sheets

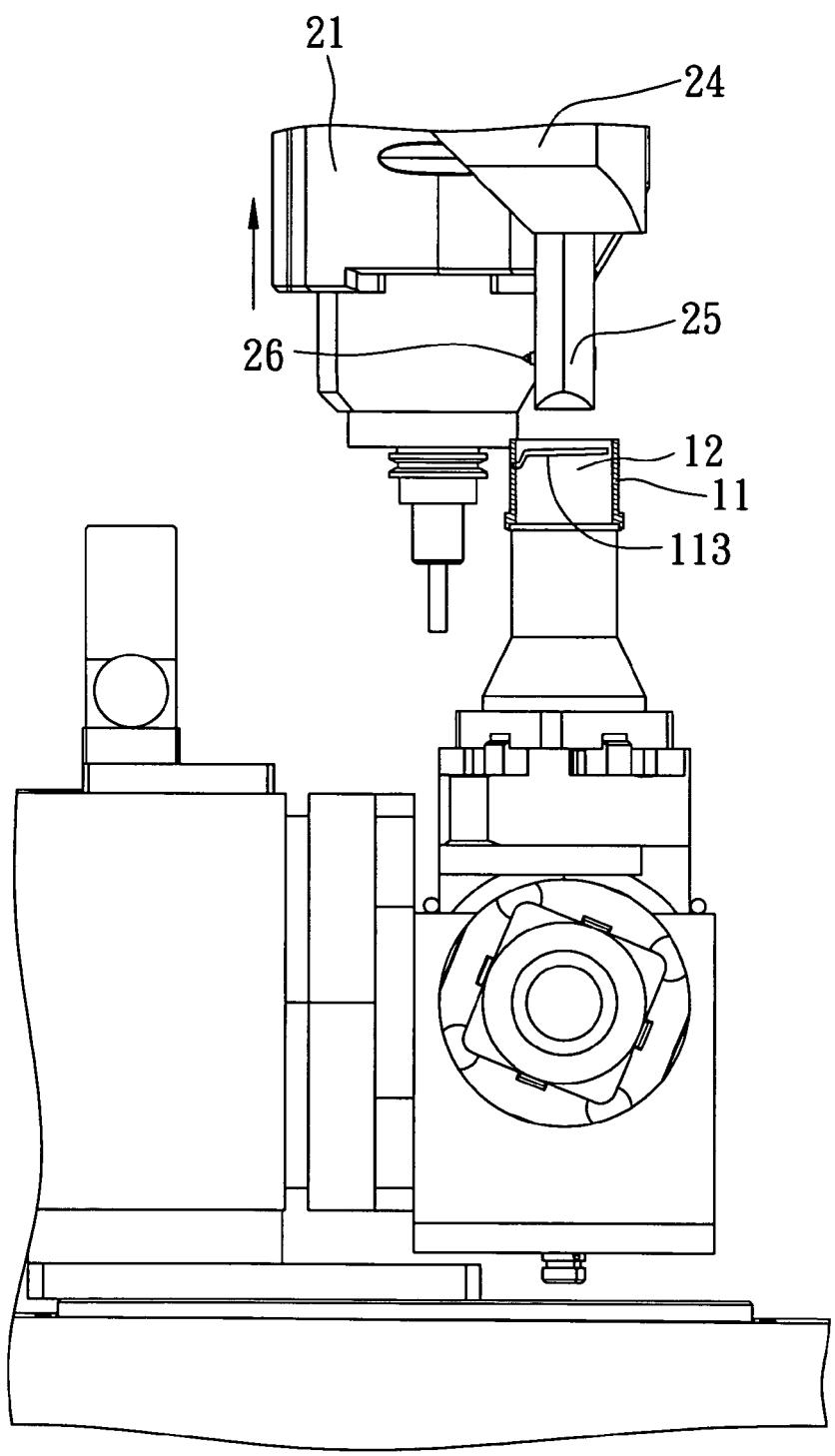
FIG. 11
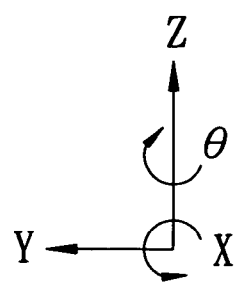

METHOD FOR PROCESSING A LENS BARREL HAVING A TUBULAR WALL THAT DEFINES A HOLE, AND DEVICE FOR IMPLEMENTING THE METHOD

CROSS-REFERENCE TO RELATED APPLICATION

This application claims priority of Taiwanese Application No. 093117486, filed on Jun. 17, 2004.

BACKGROUND OF THE INVENTION

1. Field of the Invention

The invention relates to a method for processing a lens barrel, more particularly to a method for processing a lens barrel having a tubular wall that defines a hole. The invention also relates to a device for implementing the method.

2. Description of the Related Art

Referring to FIG. 1, a conventional variable focus lens includes an outer barrel 1, a lens barrel 2 having two guide grooves 201 formed at an inner surface thereof, a positioning ring 3, a first lens part 4 having a guide pin 401 guided in one of the grooves 201, and a second lens part 5 having a guide pin 501 guided in the other of the grooves 201. In use, the first and second lens parts 4,5 can be moved relative to each other through guiding activity of the guide pins 401,501 along the guide grooves 201, respectively to vary the relative distance between the first and second lens parts 4,5 and to create a variable focus effect. However, the grooves 201 in the lens barrel 2 can not be formed via conventional milling techniques. Therefore, the conventional lens barrel 2 is formed directly with the grooves 201 by injection molding in a mold. However, it is required to alter the mold repeatedly so as to correct the error of the original design of the lens barrel 2, and to make the lens barrel 2 having the desired grooves 201. Therefore, the conventional molding method for making the lens barrel 2 is time-wasting, and increases the manufacturing cost as well.

SUMMARY OF THE INVENTION

The object of the present invention is to provide a method for processing a lens barrel to form a groove at an inner surface of the lens barrel. The present method can be used to make a sample of the lens barrel for testing to obtain a desired design for the lens barrel before mass-producing the lens barrel by injection molding.

In the first aspect of this invention, a method for processing a lens barrel having a tubular wall that defines a hole includes the steps of:

(a) providing a processing device including a processing shaft that extends in a first direction, and a cutting tool mounted on the processing shaft and rotatable about a processing axis perpendicular to the first direction, the cutting tool having a length extending along the processing axis, the processing shaft having a diametric width extending along the processing axis, the sum of the length of the cutting tool and the width of the processing shaft being smaller than an inner diameter of the hole of the lens barrel;

(b) moving the lens barrel and the processing shaft relative to each other in at least one of a second direction parallel to the processing axis and a third direction perpendicular to the first and second directions so that an image of the cutting tool projected on a plane that intersects the tubular wall and that extends in the second and third directions is orthogonal to the tubular wall;

(c) moving the processing shaft relative to the lens barrel in the first direction so that the cutting tool is close to the tubular wall;

(d) moving the processing shaft relative to the lens barrel in at least one of the second and third directions so that the cutting tool is in touch with the tubular wall;

(e) moving the processing shaft and the lens barrel relative to each other in at least one of the first direction and a rotating direction about the first direction so that the lens barrel is formed with a continuous groove on the tubular wall; and (f) moving the processing shaft and the lens barrel relative to each other so that the cutting tool is moved away from the lens barrel.

In the second aspect of this invention, a method for processing a lens barrel having a tubular wall that defines a hole includes the steps of:

(a) providing a processing device including a processing shaft that extends in a first direction, and a cutting tool mounted on the processing shaft and rotatable about a processing axis perpendicular to the first direction, the cutting tool having a length extending along the processing axis, the processing shaft having a diametric width extending along the processing axis, the sum of the length of the cutting tool and the width of the processing shaft being smaller than an inner diameter of the hole of the lens barrel;

(b) moving the lens barrel and the processing shaft relative to each other in at least one of a second direction parallel to the processing axis and a third direction perpendicular to the first and second directions so that an image projected on a plane that intersects the tubular wall and that extends in the second and third directions is aligned with the tubular wall and is orthogonal to the tubular wall;

(c) moving the processing shaft relative to the lens barrel in the first direction so that the cutting tool is in touch in the tubular wall;

(d) moving the processing shaft and the lens barrel relative to each other in at least one of the first direction and a rotating direction about the first direction so that the lens barrel is formed with a continuous groove on the tubular wall; and (e) moving the processing shaft and the lens barrel relative to each other so that the cutting tool is moved away from the lens barrel.

In the third aspect of this invention, a device for processing a lens barrel having an inner diameter includes a first spindle head movable in a first direction, a spindle mounted on the first spindle head and extending in the first direction, a second spindle head mounted on and movable with the first spindle head, a processing shaft mounted on the second spindle head and extending in the first direction, a first cutting tool mounted on the processing shaft and rotatable about a processing axis perpendicular to the first direction, and a second cutting tool mounted on the spindle and rotatable about an axis of rotation extending in the first direction. The first cutting tool has a length extending along the processing axis. The processing shaft has a diametric width extending along the processing axis. The sum of the length of the first cutting tool and the width of the processing shaft is smaller than the inner diameter of the lens barrel.

BRIEF DESCRIPTION OF THE DRAWINGS

Other features and advantages of the present invention will become apparent in the following detailed description of the preferred embodiments with reference to the accompanying drawings, of which:

FIGS. 5 to 12 are schematic views showing consecutive steps of the preferred embodiment of FIG. 4.

DETAILED DESCRIPTION OF THE PREFERRED EMBODIMENTS

Figure 1:
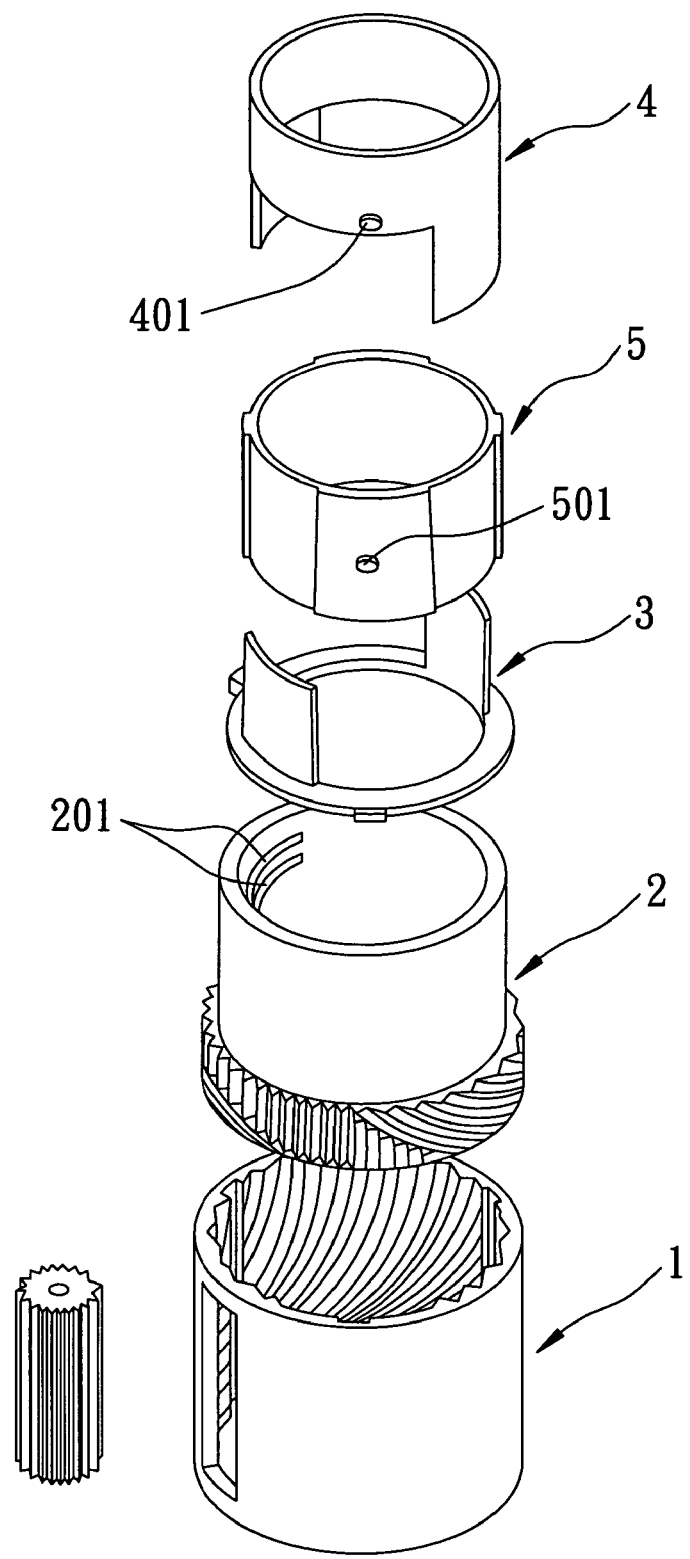
FIG. 1 is an exploded perspective view of a conventional variable focus lens.

Before the present invention is described in greater detail, it should be noted that like elements are denoted by the same reference numerals throughout the disclosure.

Figure 2:
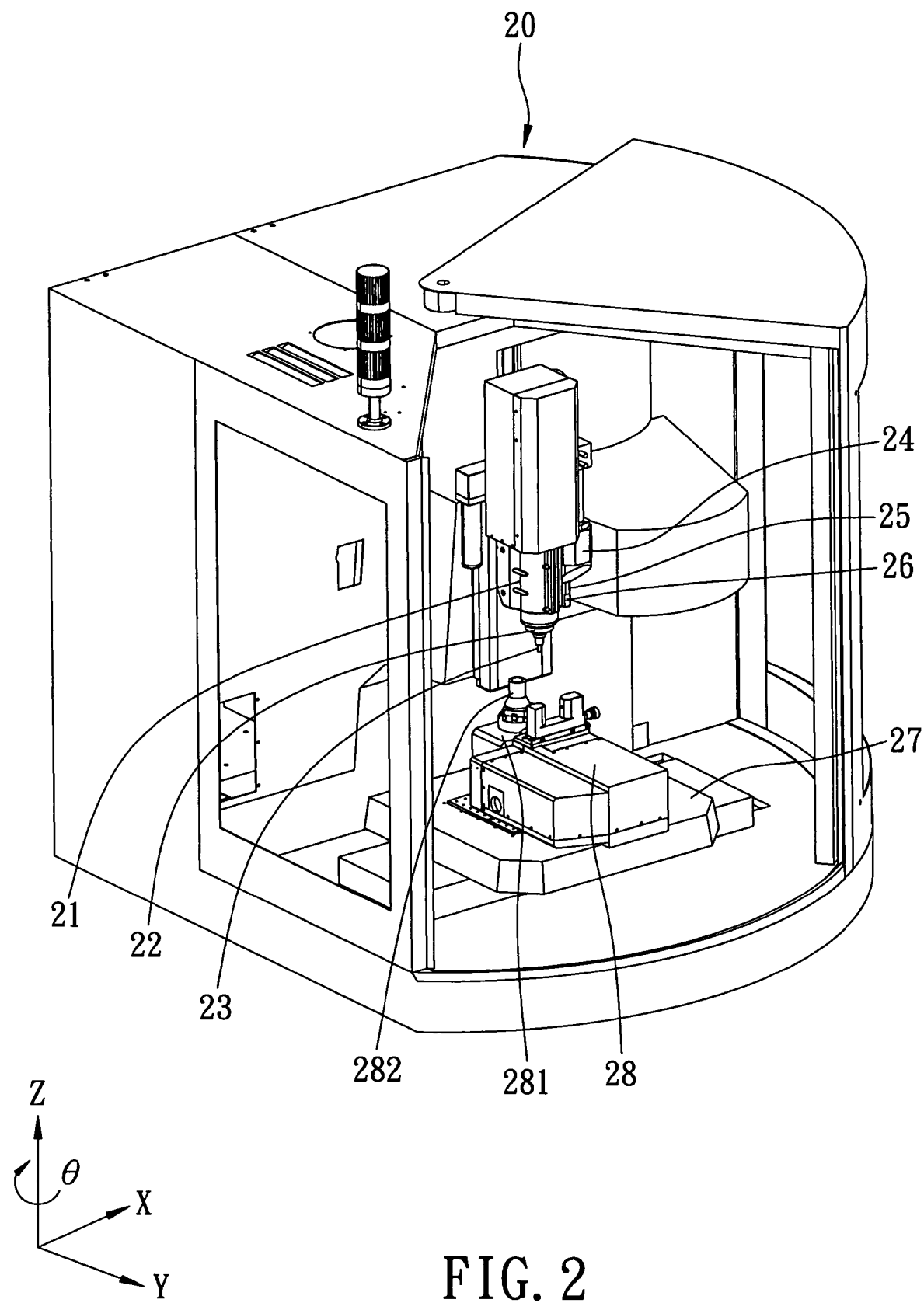
FIG. 2 is a perspective view of the preferred embodiment of a device for processing a lens barrel according to this invention.
Figure 3:
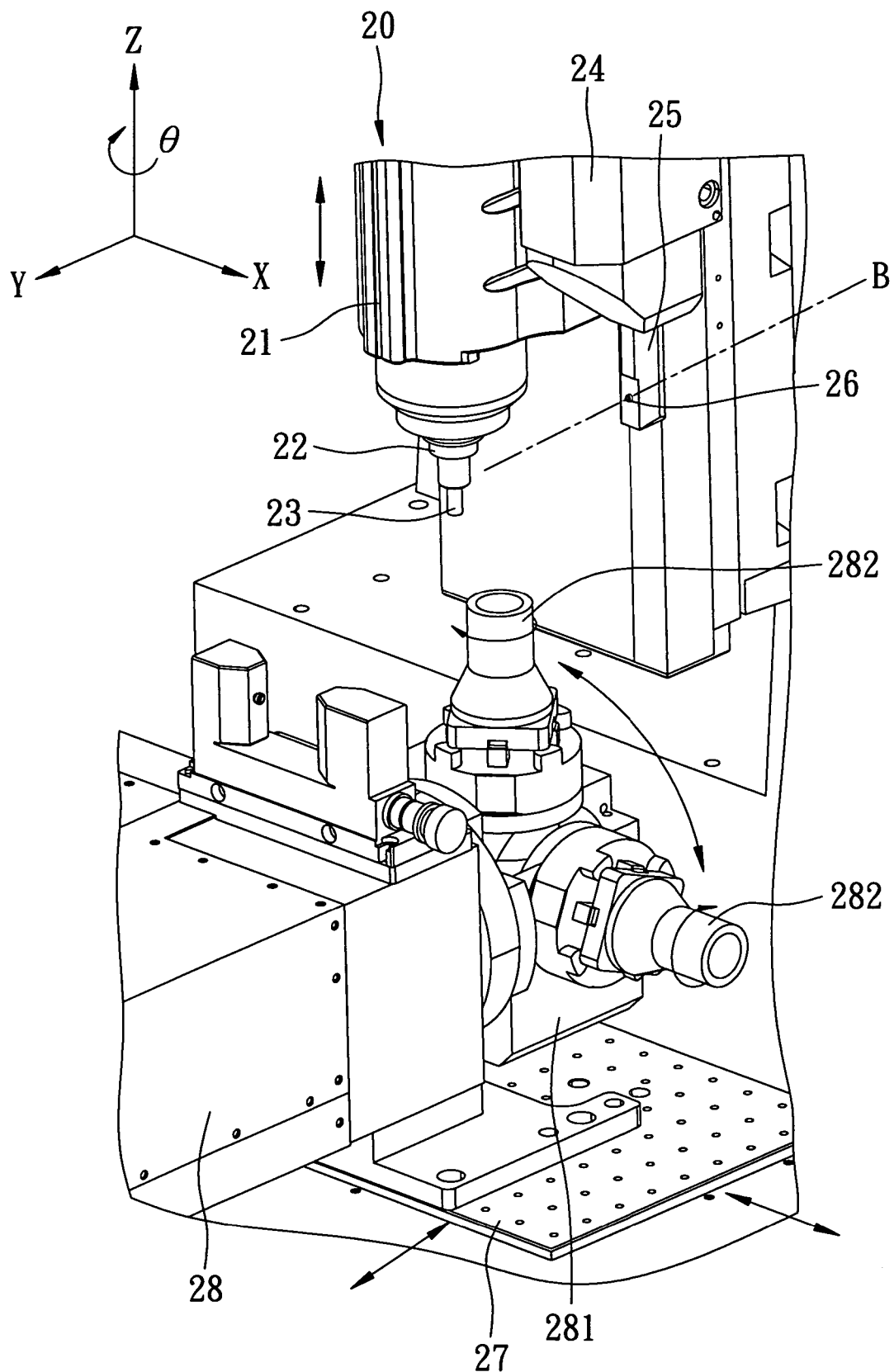
FIG. 3 is an enlarged fragmentary perspective view of the preferred embodiment of the device.
Figure 5:
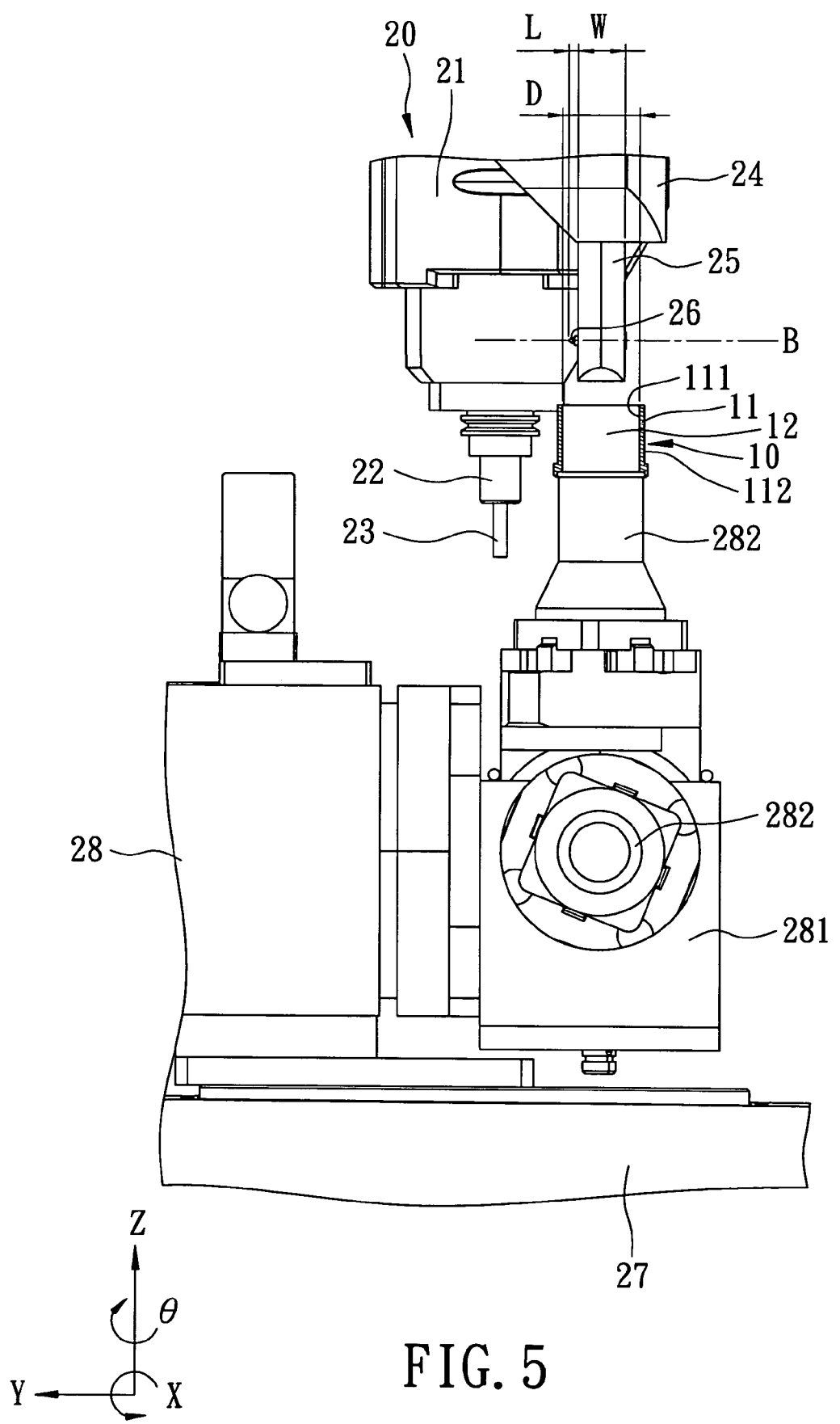
Figure 6:
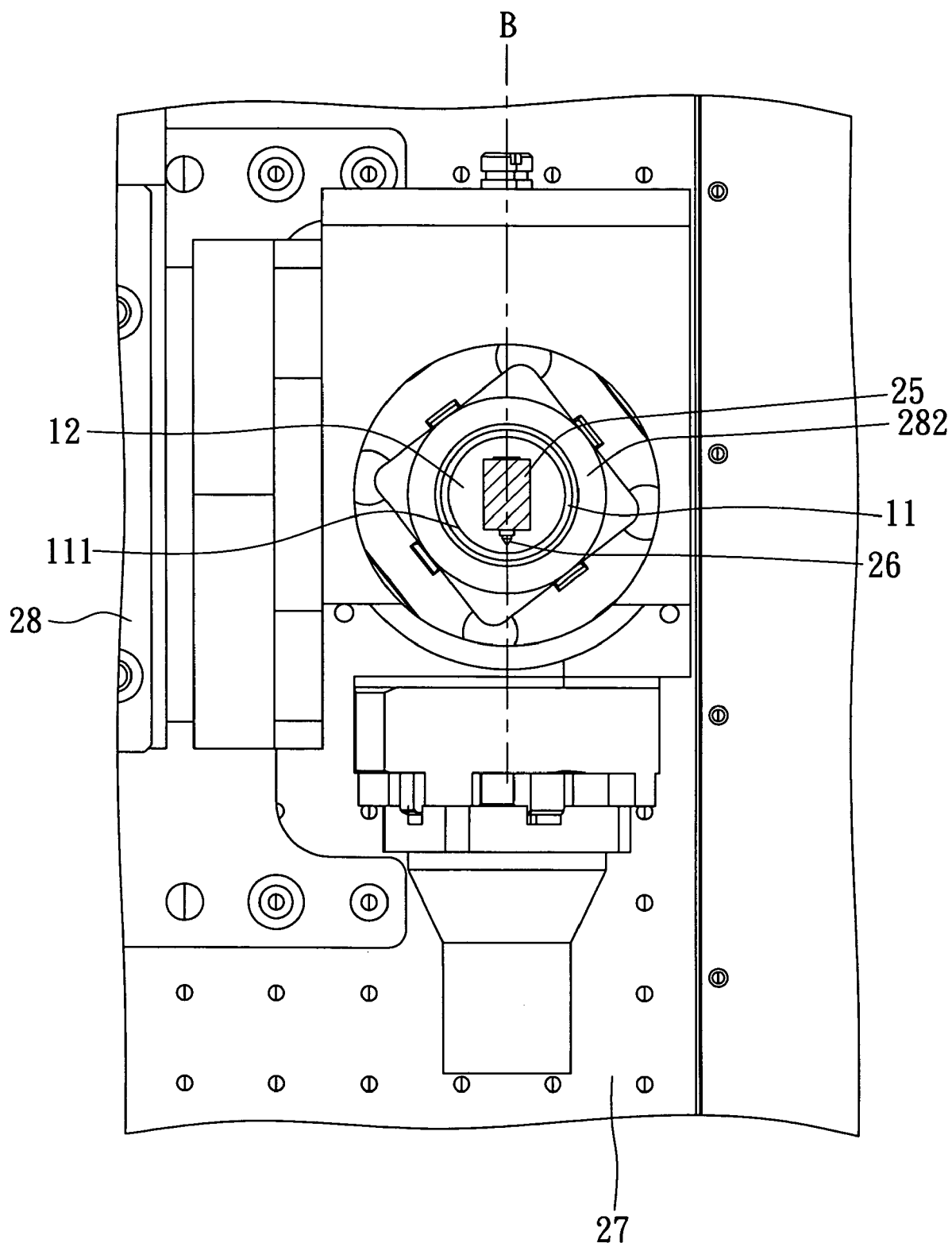

Referring to FIGS. 2, 3 and 5, the preferred embodiment of the device 20 for processing a lens barrel 10 having an inner diameter includes a first spindle head 21 movable in a first direction (Z), a spindle 22 mounted on the first spindle head 21 and extending in the first direction (Z), a second spindle head 24 mounted on and movable with the first spindle head 21, a processing shaft 25 mounted on the second spindle head 24 and extending in the first direction (Z), a first cutting tool 26 mounted on the processing shaft 25 and rotatable about a processing axis (B) perpendicular to the first direction (Z), a second cutting tool 23 mounted on the spindle 22 and rotatable about an axis of rotation extending in the first direction (Z), a work piece table 27 movable in second and third directions (Y,X) which are perpendicular to each other and which are perpendicular to the first direction (Z), and a divide head 28 mounted on the work piece table 27. The divide head 28 includes a rotatable seat 281 rotatable about an axis of rotation extending in the second direction (Y), and a positioning member 282 mounted on the rotatable seat 281 to position the lens barrel 10 thereon. The positioning member 282 is rotatable about an axis of rotation extending in the first direction (Z) to move the lens barrel 10. The first cutting tool 26 has a length extending along the processing axis (B). The processing shaft 25 has a diametric width extending along the processing axis (B). The sum of the length of the first cutting tool 26 and the width of the processing shaft 25 is smaller than the inner diameter of the lens barrel 10.

Figure 4:
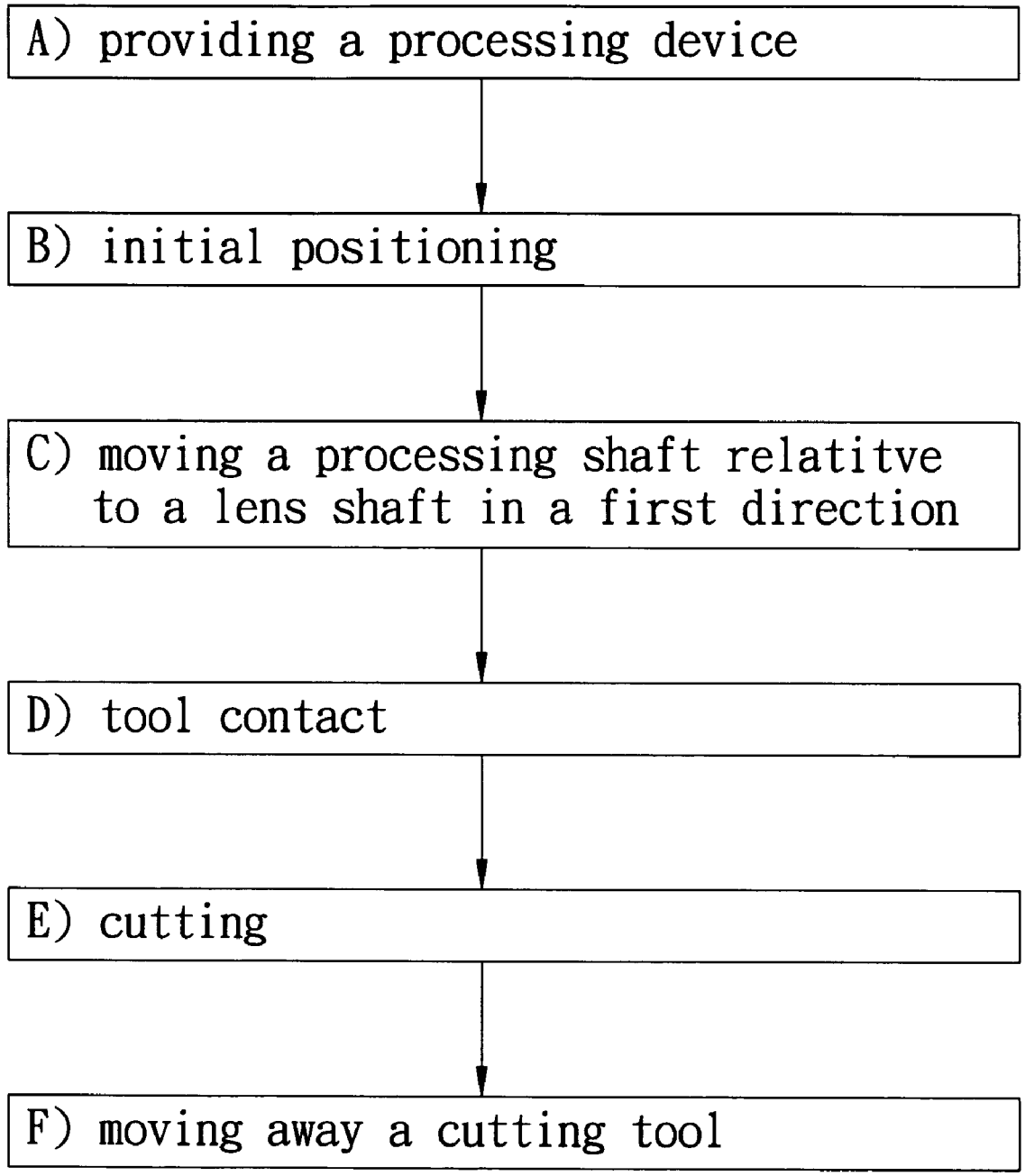
FIG. 4 is a flow diagram of the first preferred embodiment of a method for processing a lens barrel according to this invention.

Referring further to FIG. 4, the first preferred embodiment of the method for processing a lens barrel 10 having a tubular wall 11 that defines a hole 12 according to this invention includes the following steps:

A) Providing a Processing Device 20:

The aforesaid processing device 20 is provided, and the lens barrel 10 is positioned on the positioning member 282 of the divide head 28. Referring to FIG. 5, the first cutting tool 26 has a length (L) extending along the processing axis (B). The processing shaft 25 has a diametric width (W) extending along the processing axis (B). The sum of the length (L) and the width (W) is smaller than an inner diameter (D) of the hole 12 of the lens barrel 10.

B) Initial Positioning:

The lens barrel 10 and the processing shaft 25 are moved relative to each other in at least one of the second direction (Y) and the third direction (X) so that an image of the first cutting tool 26 projected on a plane that intersects the tubular wall 11 and that extends in the second and third directions (Y,X) passes through a center of the hole 12 and is orthogonal to an inner surface 111 of the tubular wall 11.

Figure 7:
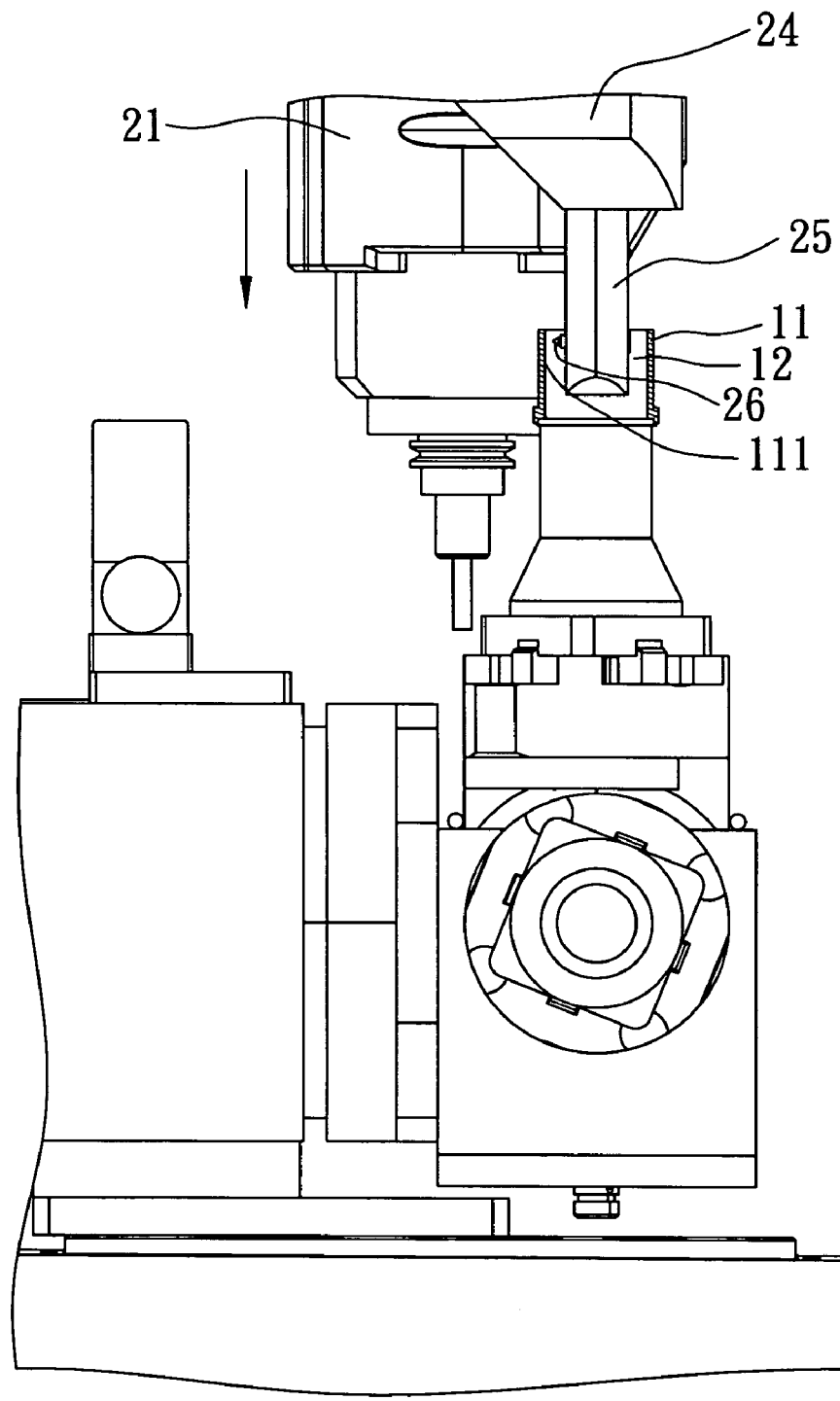
Figure 7:
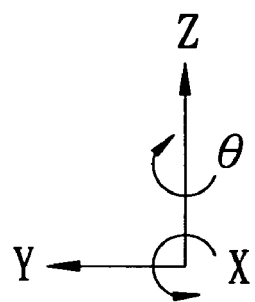

C) Moving the Processing Shaft 25 Relative to the Lens Barrel 10 in the First Direction (Z):

Referring to FIG. 7, the processing shaft 25 is moved relative to the lens barrel 10 in the first direction (Z) so that the first cutting tool 26 is moved into the hole 12 of the lens barrel 10 and is close to the inner surface 111 of the tubular wall 11 of the lens barrel 10.

Figure 8:
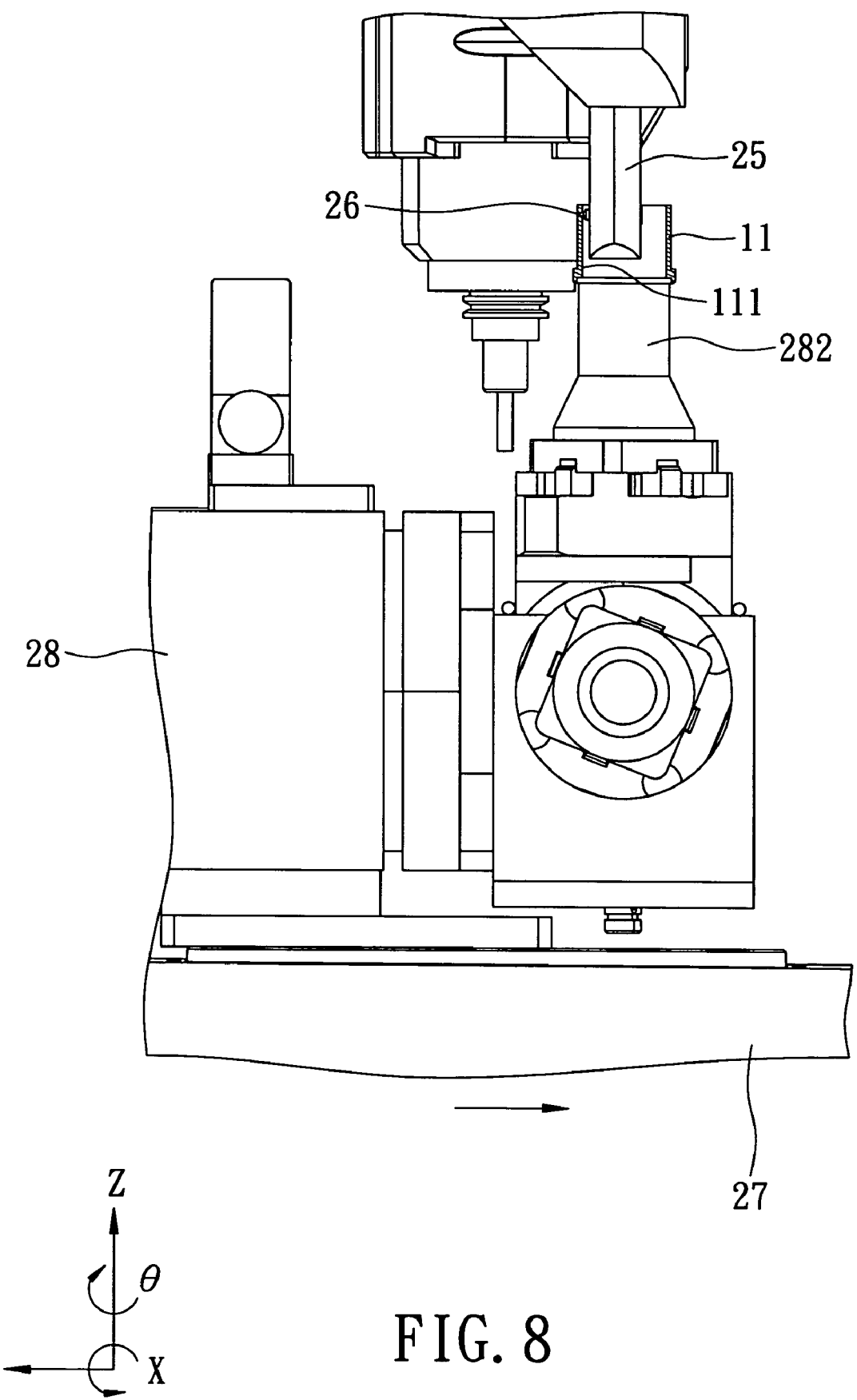

D) Tool Contact:

Referring to FIG. 8, the processing shaft 25 is moved relative to the lens barrel 10 in at least one of the second and third directions (Y,X) by moving the work piece table 27 to displace the divide head 28 so that the first cutting tool 26 is in touch with and is able to drill into the inner surface 111 of the tubular wall 11.

Figure 9:
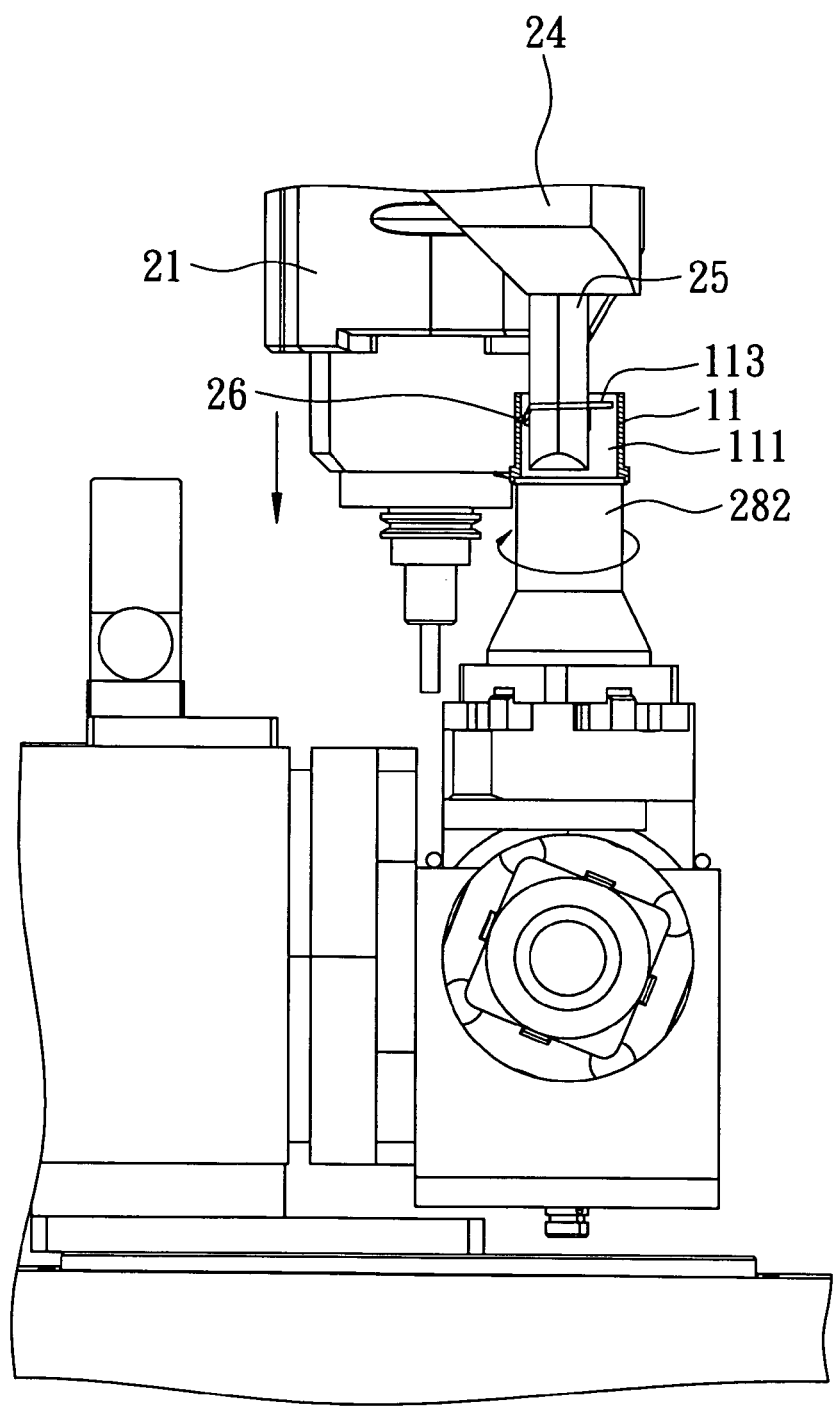

E) Cutting:

Referring to FIG. 9, the lens barrel 10 positioned on the positioning member 282 is rotated relative to processing shaft 25 in a rotating direction (θ) about the first direction (Z) while the processing shaft 25 is actuated by the first spindle head 21 to move downward in the first direction (Z) so that the lens barrel 10 is cut and formed with a continuous groove 113 in the inner surface 111 of the tubular wall 11.

Figure 10:
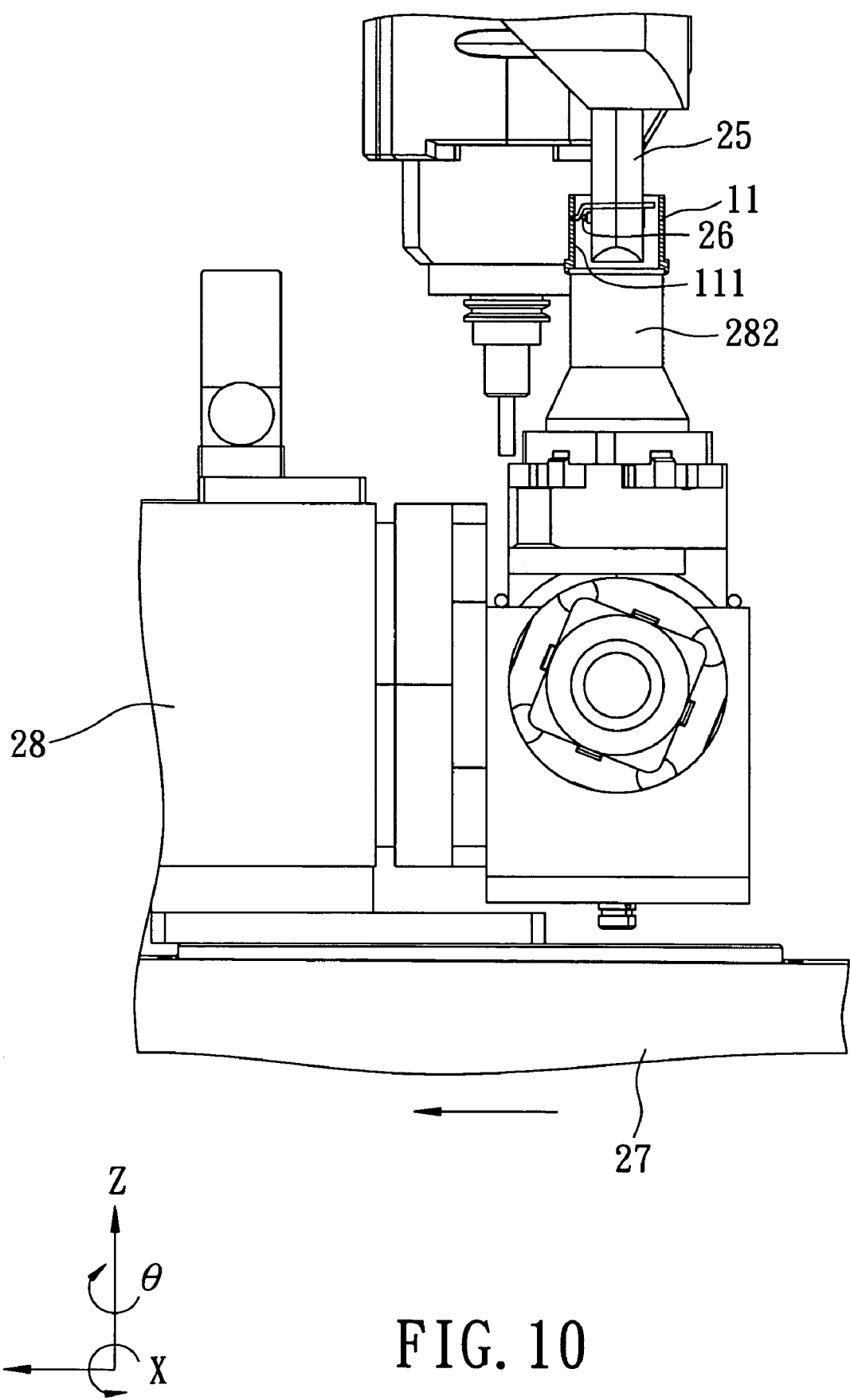

F) Moving Away the First Cutting Tool 26:

Referring to FIG. 10, the processing shaft 25 and the lens barrel 10 actuated by the work piece table 27 are moved relative to each other in at least one of the second and third directions (Y,X) so that the first cutting tool 26 is moved away from the inner surface 111 of the tubular wall 11. Referring to FIG. 11, the processing shaft 25 actuated by the first spindle head 21 and the lens barrel 10 are moved relative to each other in the first direction (Z) so that the first cutting tool 26 is moved upward and away from the lens barrel 10. Therefore, the continuous groove 113 having the identical function to that of the groove 201 of the prior art described above can be formed in the inner surface 111 of the tubular wall 11 of the lens barrel 10.

Figure 12:
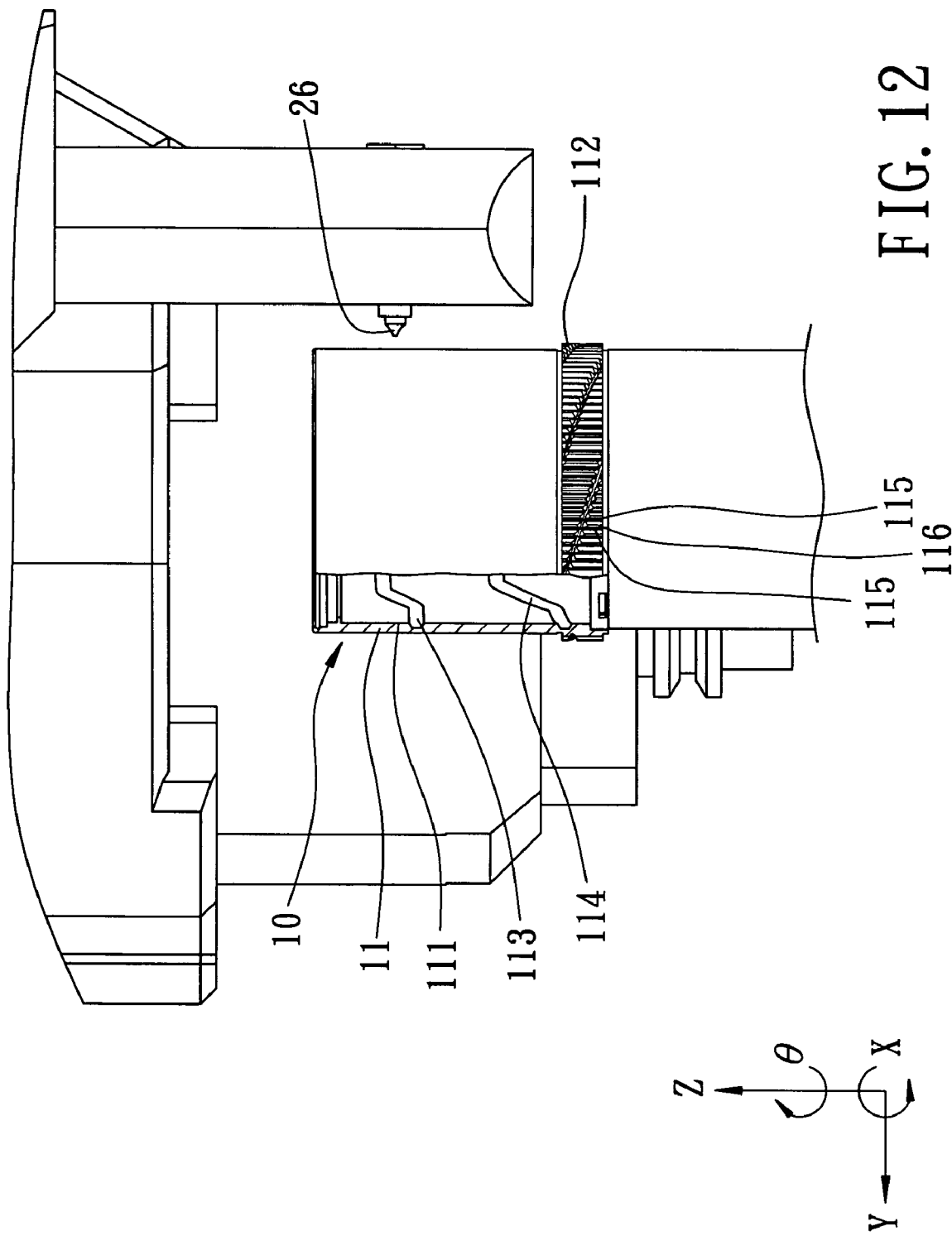

Referring to FIG. 12, another continuous groove 114 can be formed in the inner surface 111 of the tubular wall 11 of the lens barrel 10 by repeating the aforesaid steps B) to F). Similarly, a plurality of vertical continuous grooves 115 spaced apart from each other can be formed in an outer surface 112 of the tubular wall 11 of the lens barrel 10 by using steps similar to those described above, in which the lens barrel 10 is not rotated relative to the processing shaft 25 while the processing shaft 25 is moved downward in the first direction (Z) so that the lens barrel 10 is formed with the vertical continuous grooves 115 in the outer surface 112 of the tubular wall 11. A plurality of teeth 116 are formed, each of which is defined by two adjacent vertical continuous grooves 115. Therefore, a toothed ring is formed on the outer surface 112 of the tubular wall 11 of the lens barrel 10.

In view of the aforesaid, the method of this invention has the following advantages:

1) Prior to mass-production of the lens barrel 10 having the grooves 113,114 by molding, a sample of the lens barrel 10 can be made for testing so as to check whether it is required to modify the original design for the lens barrel 10, and to obtain the optimal parameters required for the production of the lens barrel 10. Therefore, the aforesaid disadvantages of the prior art can be avoided.

2) A further cutting process for the lens barrel 10 can be performed using the second cutting tool 23. Since the lens barrel 10 is always positioned by the positioning member 282 during the cutting by the first cutting tool 26 and the subsequent cutting by the second cutting tool 23, the processing precision of the lens barrel 10 can be improved.

Notably, other structures, labels, or engraved patterns can be formed in the inner surface 111 or the outer surface 112 of the tubular wall 11 of the lens barrel 10 by the method of this invention.

Referring to FIGS. 13 to 18, the second preferred embodiment of the method according to this invention includes the following steps:

A) Providing a Processing Device 20:

The processing device 20 used in the first preferred embodiment is prepared, and the lens barrel 10 is positioned on the positioning member 282 of the divide head 28.

Figure 13:
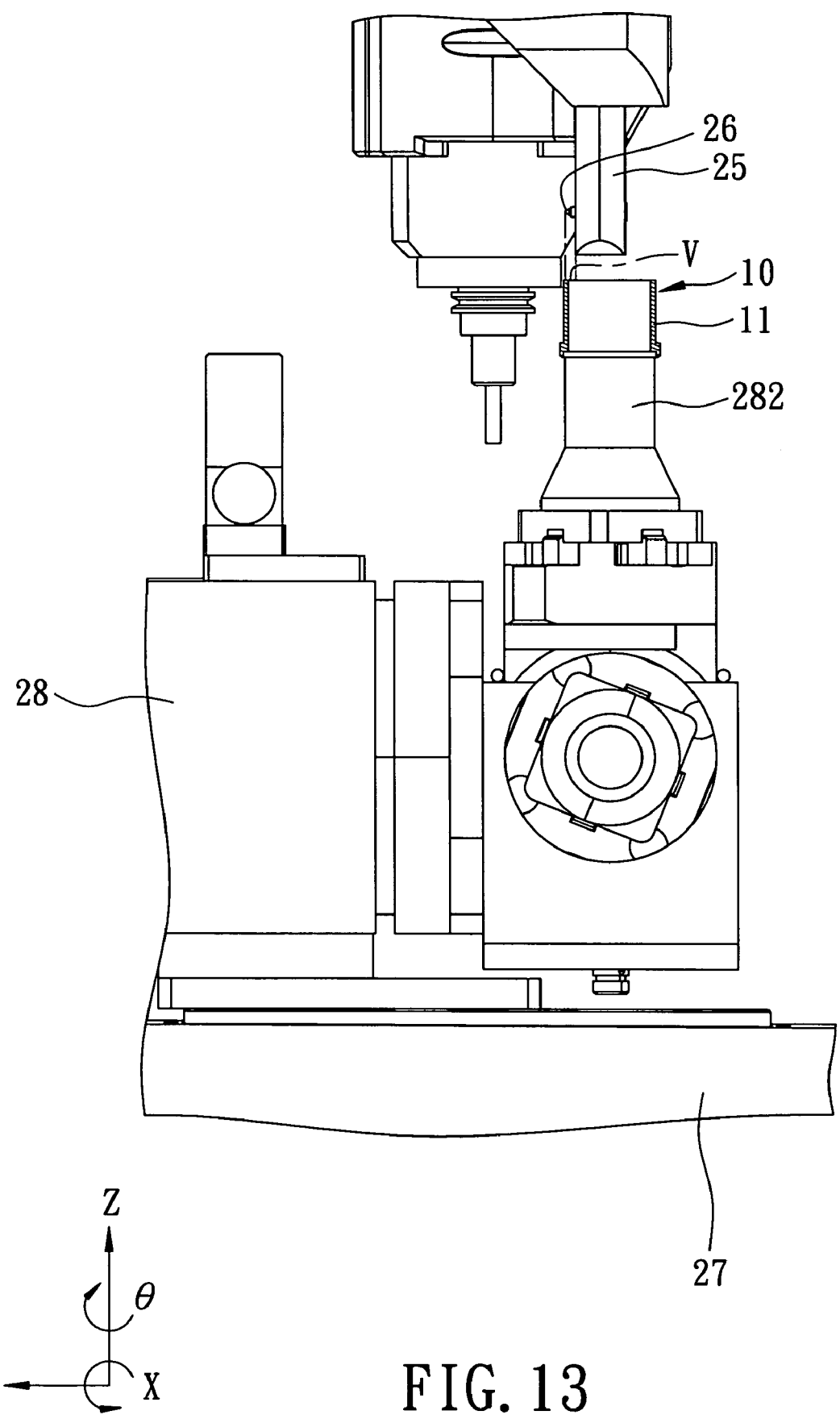
FIGS. 13 to 18 are schematic views showing consecutive steps of the second preferred embodiment of a method for processing a lens barrel according to this invention.
Figure 14:
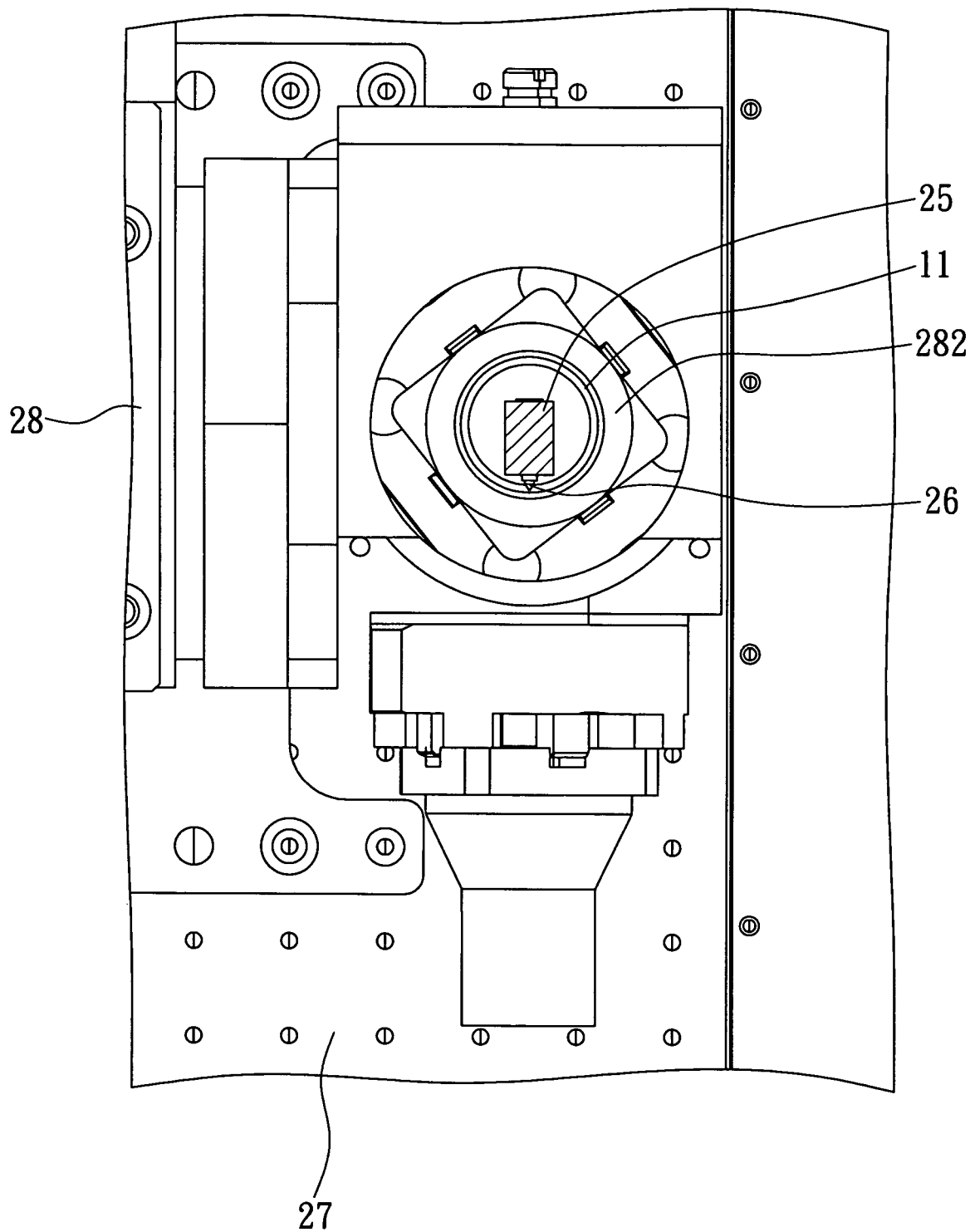

B) Initial Positioning:

Referring to FIGS. 13 and 14, the lens barrel 10 and the processing shaft 25 are moved relative to each other in at least one of the second direction (Y) and the third direction (X) so that an image projected on a plane that intersects the tubular wall 11 and that extends in the second and third directions (Y,X) is aligned with the tubular wall 11 and is orthogonal to the tubular wall 11.

Figure 15:
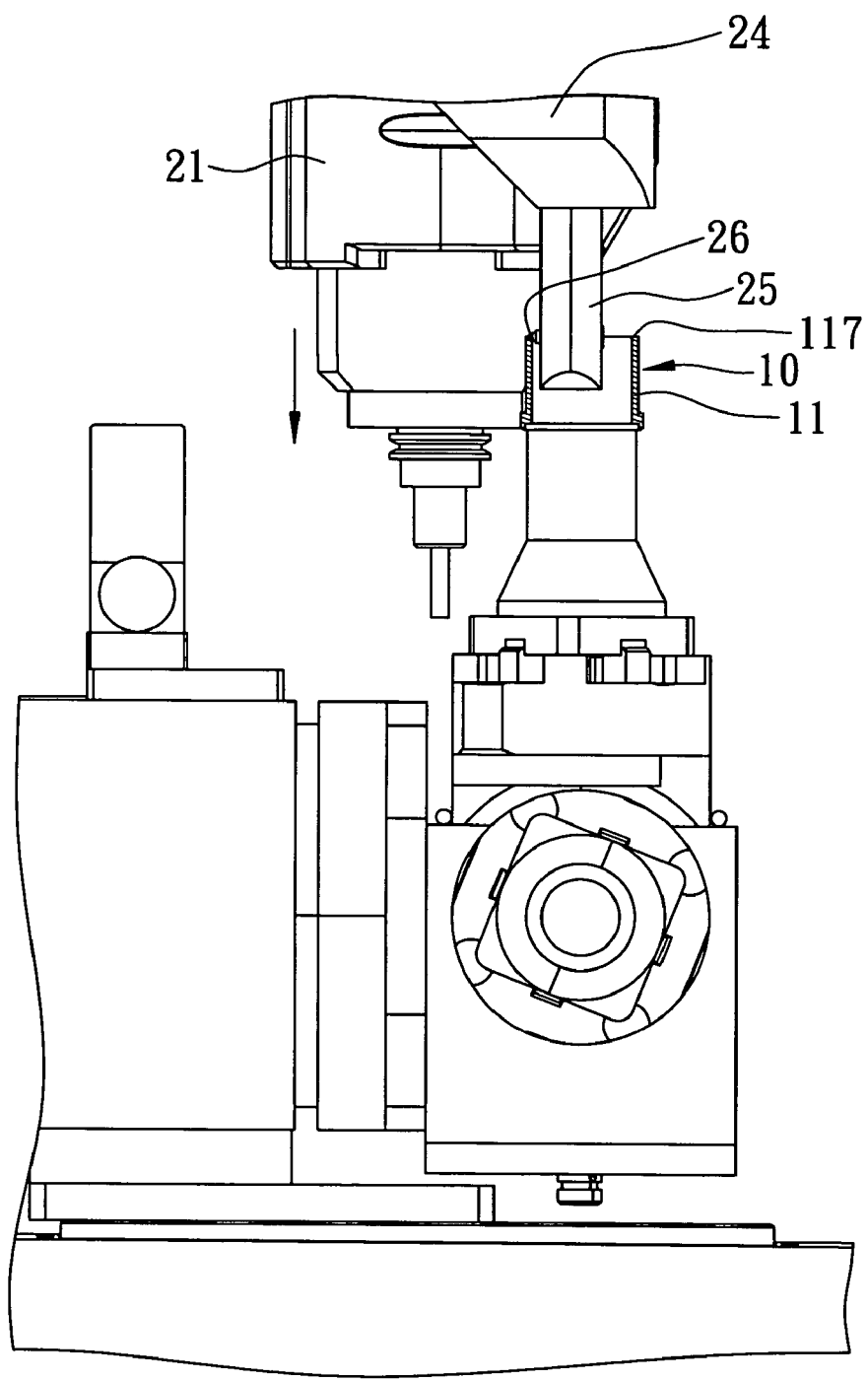

C) Tool Contact:

Referring to FIG. 15, the processing shaft 25 is moved downward relative to the lens barrel 10 in the first direction (Z) so that the cutting tool 26 is in touch with the tubular wall 11 at an end surface 117 facing toward the cutting tool 26.

Figure 16:
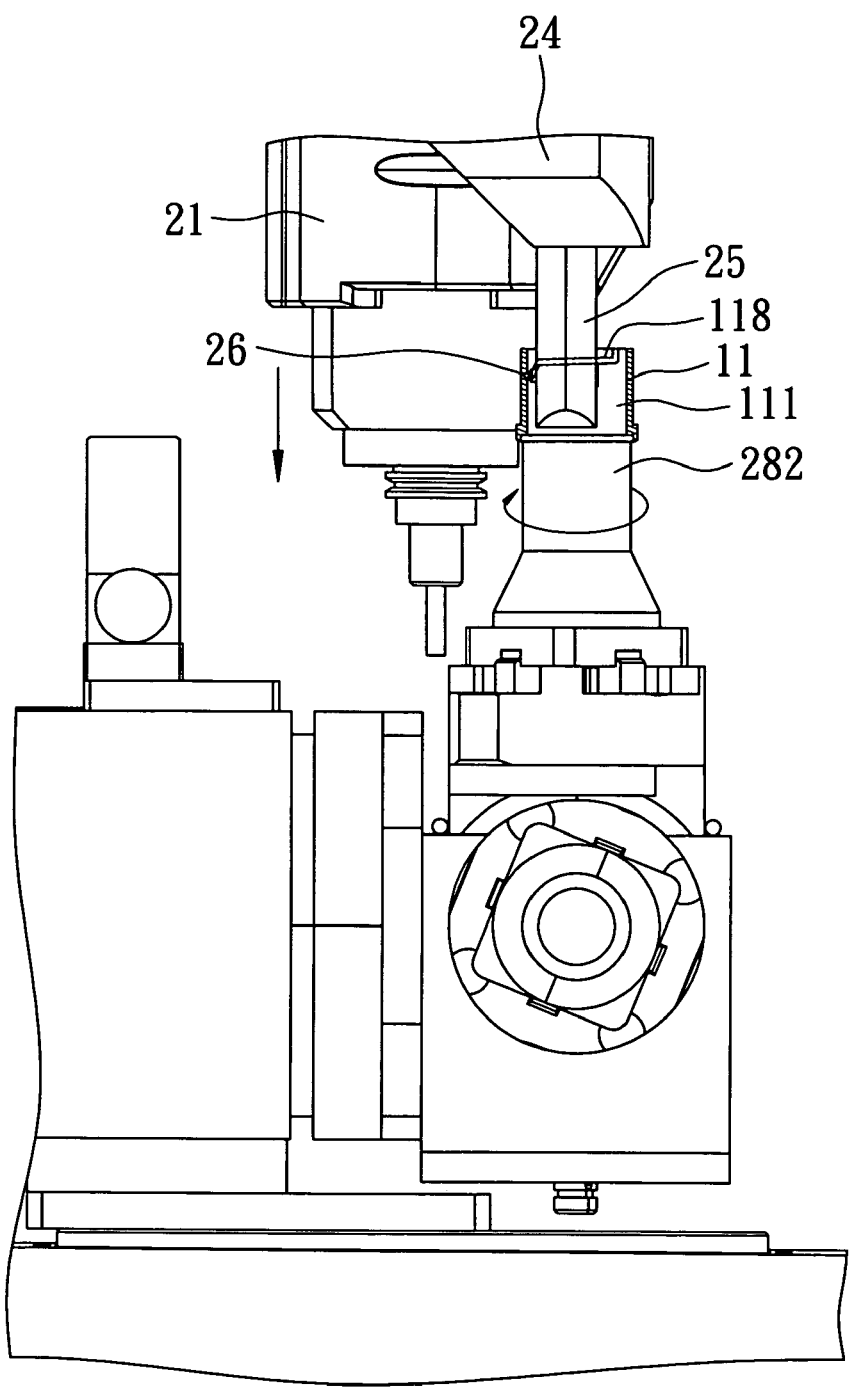

D) Cutting:

Referring to FIG. 16, the lens barrel 10 positioned on the positioning member 282 is rotated relative to the processing shaft 25 in a rotating direction (θ) about the first direction (Z) while the processing shaft 25 is actuated by the first spindle head 21 to move downward in the first direction (Z) so that the lens barrel 10 is cut from the end surface 117, and is formed with a continuous groove 118 extending downward from the end surface 117 to the inner surface 111 of the tubular wall 11.

Figure 17:
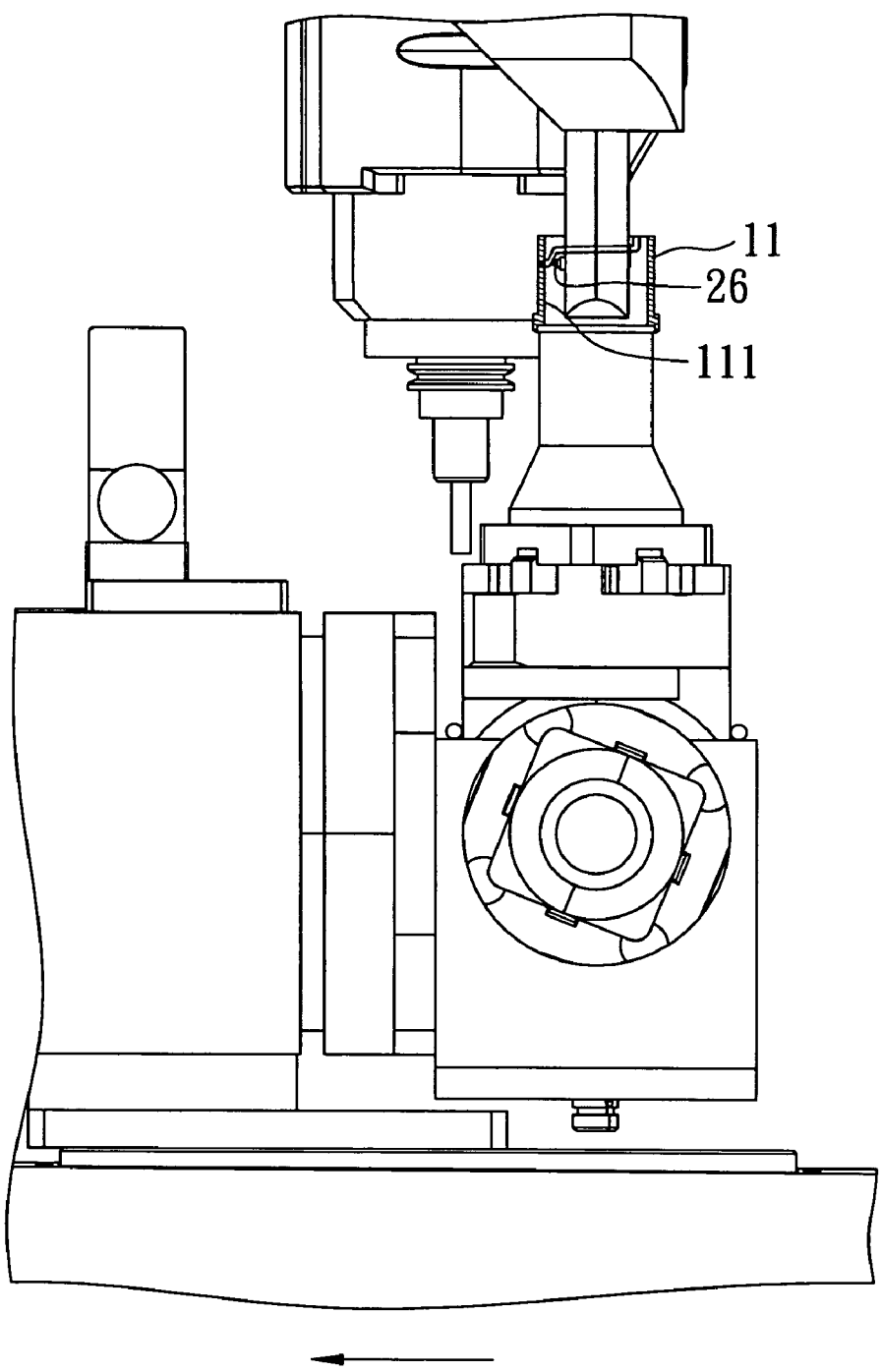
Figure 17:
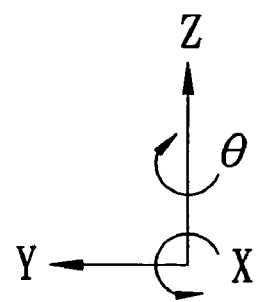
Figure 18:
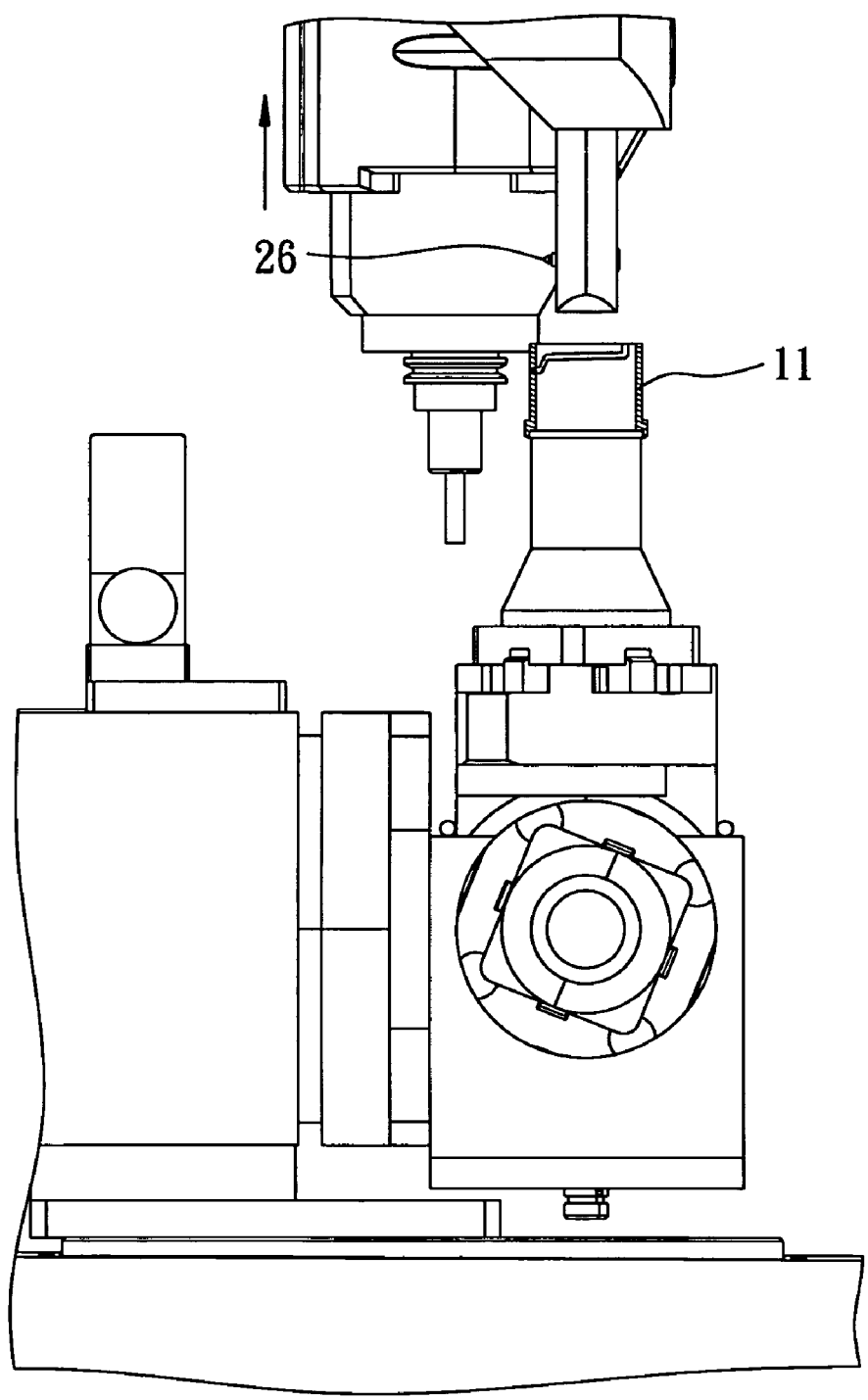
Figure 18:
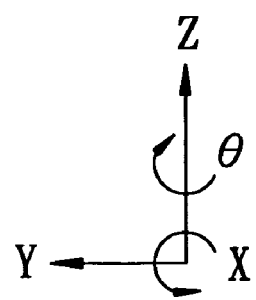

E) Moving Away the Cutting Tool 26:

Referring to FIGS. 17 and 18, the step F) of the method of the first preferred embodiment is conducted to move the cutting tool 26 away from the lens barrel 10.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A method for processing a lens barrel having a tubular wall that defines a hole, comprising the steps of:
    (a) providing a processing device including a processing shaft that extends in a first direction, and a first cutting tool mounted on the processing shaft and rotatable about a processing axis perpendicular to the first direction, the first cutting tool having a length extending along the processing axis, the processing shaft having a diametric width extending along the processing axis, the sum of the length of the first cutting tool and the width of the processing shaft being smaller than an inner diameter of the hole of the lens barrel;
    (b) moving the lens barrel and the processing shaft relative to each other in at least one of a second direction parallel to the processing axis and a third direction perpendicular to the first and second directions so that an image of the first cutting tool projected on a plane that intersects the tubular wall and that extends in the second and third directions is orthogonal to the tubular wall;
    (c) moving the processing shaft relative to the lens barrel in the first direction so that the first cutting tool is close to the tubular wall;
    (d) moving the processing shaft relative to the lens barrel in at least one of the second and third directions so that the first cutting tool is in touch with the tubular wall;
    (e) moving the processing shaft and the lens barrel relative to each other in at least one of the first direction and a rotating direction about the first direction so that the lens barrel is formed with a continuous groove on the tubular wall; and
    (f) moving the processing shaft and the lens barrel relative to each other so that the first cutting tool is moved away from the lens barrel.

2. The method as claimed in claim 1, wherein the image of first cutting tool is orthogonal to an inner surface of the tubular wall in the step (b).

3. The method as claimed in claim 2, wherein the first cutting tool is moved into the lens barrel and is close to the inner surface of the tubular wall of the lens barrel in the step (c).

4. The method as claimed in claim 3, wherein the first cutting tool is in touch with the inner surface of the tubular wall in the step (d).

5. The method as claimed in claim 4, wherein the continuous groove is formed in the inner surface of the tubular wall in the step (e).

6. The method as claimed in claim 5, wherein the step (f) includes (f1) moving the processing shaft and the lens barrel relative to each other in at least one of the second and third directions so that the first cutting tool is moved away from the inner surface of the tubular wall, and (f2) moving the processing shaft and the lens barrel relative to each other in the first direction so that the first cutting tool is moved away from the lens barrel.

7. The method as claimed in claim 1, wherein the image of the first cutting tool is orthogonal to an outer surface of the tubular wall in the step (b).

8. The method as claimed in claim 7, wherein the first cutting tool is proximate to the outer surface of the tubular wall of the lens barrel in the step (c).

9. The method as claimed in claim 8, wherein the first cutting tool is in touch with the outer surface of the tubular wall in the step (d).

10. The method as claimed in claim 9, wherein the continuous groove is formed in the outer surface of the tubular wall in the step (e).

11. The method as claimed in claim 10, wherein the step (f) includes (f1) moving the processing shaft and the lens barrel relative to each other in at least one of the second and third directions so that the first cutting tool is moved away from the outer surface of the tubular wall, and (f2) moving the processing shaft and the lens barrel relative to each other in the first direction so that the first cutting tool is moved away from the lens barrel.

12. The method as claimed in claim 1, wherein the processing device further includes a first spindle head movable in the first direction, a second cutting tool rotatable about the first direction, a spindle mounted on the first spindle head and holding the second cutting tool in the first direction, a second spindle head mounted on and movable with the first spindle head, a work piece table movable in the second and third directions, and a divide head mounted on the work piece table, the processing shaft being mounted on the second spindle head in the first direction, the divide head having a rotatable seat, and a positioning member mounted on the rotatable seat for positioning the lens barrel thereon.

13. A method for processing a lens barrel having a tubular wall that defines a hole, comprising the steps of:
  (a) providing a processing device including a processing shaft that extends in a first direction, and a cutting tool mounted on the processing shaft and rotatable about a processing axis perpendicular to the first direction, the cutting tool having a length extending along the processing axis, the processing shaft having a diametric width extending along the processing axis, the sum of the length of the cutting tool and the width of the processing shaft being smaller than an inner diameter of the hole of the lens barrel;
  (b) moving the lens barrel and the processing shaft relative to each other in at least one of a second direction parallel to the processing axis and a third direction perpendicular to the first and second directions so that an image projected on a plane that intersects the tubular wall and that extends in the second and third directions is aligned with the tubular wall and is orthogonal to the tubular wall;
  (c) moving the processing shaft relative to the lens barrel in the first direction so that the cutting tool is in touch in the tubular wall;
  (d) moving the processing shaft and the lens barrel relative to each other in at least one of the first direction and a rotating direction about the first direction so that the lens barrel is formed with a continuous groove on the tubular wall; and
  (e) moving the processing shaft and the lens barrel relative to each other so that the cutting tool is moved away from the lens barrel.

14. The method as claimed in claim 13, wherein the step (e) includes (e1) moving the processing shaft and the lens barrel relative to each other in at least one of the second and third directions so that the cutting tool is moved away from the tubular wall, and (e2) moving the processing shaft and the lens barrel relative to each other in the first direction so that the cutting tool is moved away from the lens barrel.

15. A device for processing a lens barrel having an inner diameter, comprising:
  a first spindle head movable in a first direction;
  a spindle mounted on said first spindle head and extending in the first direction;
  a second spindle head mounted on and movable with said first spindle head;
  a processing shaft mounted on said second spindle head and extending in said first direction;
  a first cutting tool mounted on said processing shaft and rotatable about a processing axis perpendicular to said first direction, said first cutting tool having a length extending along said processing axis, said processing shaft having a diametric width extending along said processing axis, the sum of said length of said first cutting tool and said width of said processing shaft being smaller than the inner diameter of the lens barrel;
  a second cutting tool mounted on said spindle and rotatable about an axis of rotation extending in said first direction;
  a work piece table movable in second and third directions which are perpendicular to each other, and which are perpendicular to said first direction; and
  a divide head mounted on said work piece table.

16. The device as claimed in claim 15, wherein said divide head includes a rotatable seat rotatable about an axis of rotation extending in said second direction, and a positioning member mounted on said rotatable seat for positioning the lens barrel thereon, said positioning member being rotatable about an axis of rotation extending in said first direction to move the lens barrel.

* * * * *